United States Patent
Zhu

(10) Patent No.: US 11,895,630 B2
(45) Date of Patent: Feb. 6, 2024

(54) METHOD AND DEVICE FOR IDENTIFYING DOWNLINK TRANSMISSIONS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 543 days.

(21) Appl. No.: 17/140,911

(22) Filed: Jan. 4, 2021

(65) Prior Publication Data

US 2021/0153195 A1 May 20, 2021

Related U.S. Application Data

(63) Continuation of application No. PCT/CN2018/094788, filed on Jul. 6, 2018.

(51) Int. Cl.
*H04W 72/23* (2023.01)
*H04W 72/0446* (2023.01)
*H04L 5/00* (2006.01)

(52) U.S. Cl.
CPC ....... *H04W 72/0446* (2013.01); *H04L 5/0053* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2012/0294239 A1* | 11/2012 | Lindoff | H04W 52/0232 370/328 |
| 2013/0121301 A1 | 5/2013 | Kim et al. | |
| 2014/0204807 A1* | 7/2014 | Li | H04L 5/0048 370/277 |
| 2015/0256313 A1 | 9/2015 | Kim et al. | |
| 2016/0036581 A1* | 2/2016 | Yerramalli | H04L 27/2607 370/280 |
| 2016/0165578 A1* | 6/2016 | Chen | H04L 5/0037 370/280 |
| 2016/0352455 A1 | 12/2016 | Li et al. | |
| 2017/0033913 A1 | 2/2017 | Kim et al. | |
| 2018/0076944 A1 | 3/2018 | Kim et al. | |

(Continued)

FOREIGN PATENT DOCUMENTS

| CN | 102594438 | 7/2012 |
|---|---|---|
| CN | 103873212 A | 6/2014 |

(Continued)

OTHER PUBLICATIONS

3GPP et al. (R1-1805917) (NR frame structure on unlicensed bands)—May 21-May 25, 2018 (Year: 2018).*

(Continued)

*Primary Examiner* — The Hy Nguyen
(74) *Attorney, Agent, or Firm* — Oblon, McClelland, Maier & Neustadt, L.L.P.

(57) ABSTRACT

Aspects of the disclosure provide a method and apparatus for identifying downlink transmissions. The method can be applied to a base station and can include configuring indication information used for identifying the downlink transmissions, and sending the indication information to a terminal to enable the terminal to identify the downlink transmission according to the indication information.

19 Claims, 24 Drawing Sheets

(56) References Cited

U.S. PATENT DOCUMENTS

| | | | |
|---|---|---|---|
| 2018/0212698 A1 | 7/2018 | Sun et al. | |
| 2018/0288715 A1* | 10/2018 | Ye | H04L 5/005 |
| 2019/0082453 A1* | 3/2019 | Lyu | H04L 65/40 |
| 2020/0235859 A1* | 7/2020 | Ljung | H04L 1/189 |
| 2021/0367705 A1 | 11/2021 | Li et al. | |

FOREIGN PATENT DOCUMENTS

| | | | |
|---|---|---|---|
| CN | 105578608 | 5/2016 | |
| CN | 106856670 | 6/2017 | |
| EP | 3 253 113 A1 | 12/2017 | |
| TW | 201815089 A * | 4/2018 | H04B 7/04 |
| WO | WO-2015006905 A1 * | 1/2015 | H04L 5/1469 |

OTHER PUBLICATIONS

Extended European Search Report dated Jan. 4, 2022 in European Patent Application No. 18925237.2, 7 pages.

Chinese Office Action dated Mar. 3, 2022 in Chinese Patent Application No. 201880001311.6 (with English translation), 13 pages.

"NR Frame Structure and Scheduling on Unlicensed Bands" Huawei, HiSilicon, 3GPP TSG RAN WG1 Meeting #92 bis R1-1803678, Sanya, China, Apr. 16-Apr. 20, 2018, 8 pages.

International Search Report issued in International Application No. PCT/CN2018/094788 dated Mar. 29, 2019, (with English translation).

Written Opinion of the International Searching Authority issued in International Application No. PCT/CN2018/094788 dated Mar. 29, 2019 (3 pages).

* cited by examiner

METHOD AND DEVICE FOR IDENTIFYING DOWNLINK TRANSMISSIONS

CROSS-REFERENCE TO RELATED APPLICATIONS

The application is a continuation application of PCT Application No. PCT/CN2018/094788 filed on Jul. 6, 2018, the disclosure of which is hereby incorporated by reference in its entity.

BACKGROUND

New generation communication systems need to support flexible configuration of various types of services. Different types of services correspond to different service requirements. For example, services of an enhanced Mobile Broad Brand (eMBB) type mainly require a broad bandwidth and a high speed, services of an Ultra Reliable Low Latency Communication (URLLC) type mainly require high reliability and a low delay, and services of a massive Machine Type Communication (mMTC) type mainly require a large number of connections. However, only licensed spectra are not able to meet the increasing demands of the new generation communication systems for more services.

SUMMARY

The disclosure relates to the technical field of communications, including to a method and device for identifying downlink transmissions.

A first aspect according to the disclosure can provide a method for identifying downlink transmissions that can be applied to a base station. The method can include indication information used for identifying the downlink transmissions is configured, and the indication information is transmitted to a terminal to enable the terminal to identify the downlink transmissions according to the indication information.

According to an embodiment of the disclosure, the indication information can include a first indication state or a second indication state. The first indication state is used for indicating that no changes occur in a current downlink transmission, and the second indication state is used for indicating that the current downlink transmission is a new downlink transmission.

According to another embodiment of the disclosure, the indication information includes serial number information used for representing a current downlink transmission.

According to other embodiments of the disclosure, the operation that the indication information is transmitted to the terminal can include that an explicit indication signaling including the indication information is configured, and the explicit indication signaling is transmitted to the terminal to enable the terminal to obtain the indication information from the explicit indication signaling. The explicit indication signaling can be a downlink control signaling, the indication information is in a fixed or configurable information field of the downlink control signaling, and the information field has a fixed or configurable length.

According to an embodiment of the disclosure, the operation that the indication information is transmitted to the terminal can include an implicit indication signaling is configured according to a defined rule. The implicit indication signaling includes a scrambling sequence used for representing the indication information. The operation can further include that the implicit indication signaling is transmitted to the terminal to enable the terminal to determine the indication information according to the scrambling sequence included in the implicit indication signaling.

According to an embodiment of the disclosure, the defined rule includes a correspondence between at least one designated scrambling sequence and designated indication information. The method further includes that the defined rule is transmitted to the terminal in a predefined manner or by means of signaling notification.

According to an embodiment of the disclosure, the operation that the configuration information is transmitted to the terminal includes Channel Occupancy Time (COT) configuration information that is used for implicitly representing the indication information is configured. Further, the COT configuration information is transmitted to the terminal to enable the terminal to determine the indication information according to the COT configuration information.

According to an exemplary embodiment of the disclosure, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or, the beginning position of the current COT, the ending position of the current COT, and the power information of the pilot used for performing measurement.

A second aspect according to the disclosure provides a method for identifying downlink transmissions that is applied to a terminal. The method can include that indication information used for identifying the downlink transmissions is received from a base station, and the downlink transmissions are identified according to the indication information.

According to an embodiment of the disclosure, the indication information includes a first indication state or a second indication state. The first indication state is used for indicating that no changes occur in a current downlink transmission, and the second indication state is used for indicating that the current downlink transmission is a new downlink transmission.

The operation that the downlink transmissions is identified according to the indication information can include that, in response to that the indication information is the first indication state, it is determined that no changes occur in the current downlink transmission, and, in response to that the indication information is the second indication state, it is determined that the current downlink transmission is the new downlink transmission.

According to an embodiment of the disclosure, the indication information includes serial number information used for representing a current downlink transmission.

The operation that the downlink transmissions is identified according to the indication information can include that, in response to that the serial number information of the current downlink transmission is same as serial number information of a previous downlink transmission, it is determined that no changes occur in the current downlink transmission, and, in response to that the serial number information of the current downlink transmission is different from the serial number information of the previous downlink transmission, it is determined that the current downlink transmission is the new downlink transmission.

According to an embodiment of the disclosure, the operation that the indication information used for identifying the downlink transmissions is received from the base station can include an explicit indication signaling is received from the base station, herein the explicit indication signaling includes the indication information. The indication information is obtained from the explicit indication signaling.

According to an embodiment of the disclosure, the explicit indication signaling is a downlink control signaling, the indication information is in a fixed or configurable information field of the downlink control signaling, and the information field has a fixed or configurable length.

The operation that the indication information is obtained from the explicit indication signaling includes that the indication information is obtained from the information field of the downlink control signaling.

According to another embodiment of the disclosure, the operation that the indication information used for identifying the downlink transmissions is received from the base station can include that an implicit indication signaling is received from the base station, herein the implicit indication signaling includes a scrambling sequence used for representing the indication information, and the indication information is determined according to a defined rule and the scrambling sequence that is included in the implicit indication signaling.

According to an exemplary embodiment of the disclosure, the defined rule includes a correspondence between at least one designated scrambling sequence and designated indication information, and the defined rule is specified in a communication protocol, or is notified by the base station to the terminal in a predefined manner or by means of signaling notification.

According to an embodiment of the disclosure, the operation that the indication information used for identifying the downlink transmissions is received from the base station includes COT configuration information that is used for implicitly representing the indication information is received from the base station, and the indication information is determined according to the COT configuration in information.

According to an embodiment of the disclosure, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

A third aspect according to the embodiments of the disclosure provides a device for identifying downlink transmissions applied to a base station. The device can include a configuring module that is configured to configure indication information used for identifying the downlink transmissions, and a first transmitting module that is configured to transmit the indication information to a terminal to enable the terminal to identify the downlink transmissions according to the indication information.

According to an embodiment of the disclosure, the indication information includes a first indication state or a second indication state. The first indication state is used for indicating that no chances occur in a current downlink transmission, and the second indication state is used for indicating that the current downlink transmission is a new downlink transmission.

According to an embodiment of the disclosure, the indication information includes serial number information used for representing a current downlink transmission.

According to an embodiment of the disclosure, the first transmitting module can further include a first configuring sub-module that is configured to configure an explicit indication signaling including the indication information, and a first transmitting sub-module that is configured to transmit the explicit indication signaling to the terminal to enable the terminal to obtain the indication information from the explicit indication signaling.

According to an embodiment of the disclosure, the explicit indication signaling is a downlink control signaling, the indication information is in a fixed or configurable information field of the downlink control signaling, and the information field has a fixed or configurable length.

According to an embodiment of the disclosure, the first transmitting module can include a second configuring sub-module that is configured to configure an implicit indication signaling according to a defined rule, herein the implicit indication signaling includes a scrambling sequence used for representing the indication information, and a second transmitting sub-module that is configured to transmit the implicit indication signaling to the terminal to enable the terminal to determine the indication information according to the scrambling sequence included in the implicit indication signaling.

According to an embodiment of the disclosure, the defined rule includes a correspondence between at least one designated scrambling sequence and designated indication information. The device further can further include a second transmitting module that is configured to transmit the defined rule to the terminal in a predefined manner or by means of signaling notification.

According to an embodiment of the disclosure, the first transmitting module that includes a third configuring sub-module that is configured to configure COT configuration information that is used for implicitly representing the indication information, and a third transmitting sub-module that is configured to transmit the COT configuration information to the terminal to enable the terminal to determine the indication information according to the COT configuration information.

According to an embodiment of the disclosure, the COT configuration information includes at least one of a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

A fourth aspect according to the embodiments of the disclosure provides a device for identifying downlink transmissions applied to a terminal. The device can include a receiving module that is configured to receive indication information used for identifying the downlink transmissions from a base station, and an identifying module that is configured to identify the downlink transmissions according to the indication information.

According to an exemplary embodiment of the disclosure, the indication information includes a first indication state or a second indication state. The first indication state is used for indicating that no changes occur in a current downlink transmission, and the second indication state is used for indicating that the current downlink transmission is a new downlink transmission. The identifying module can include a first identifying sub-module that is configured to, in response to that the indication information is the first indication state, determine that no changes occur in the current downlink transmission, and a second identifying sub-module that is configured to, in response to that the indication information is the second indication state, determine that the current downlink transmission is the new downlink transmission.

According to an embodiment of the disclosure, the indication information includes serial number information used for representing a current downlink transmission. Further, the identifying module can include a third identifying sub-module that is configured to, in response to that the serial number information of the current downlink transmission is same as serial number information of a previous downlink transmission, determine that no changes occur in the current downlink transmission, and a fourth identifying sub-module that is configured to, in response to that the serial number information of the current downlink transmission is different from the serial number information of the previous downlink transmission, determine that the current downlink transmission is the new downlink transmission.

According to an embodiment of the disclosure, the receiving module includes a first receiving sub-module that is configured to receive an explicit indication signaling from the base station, herein the explicit indication signaling includes the indication information, and a first obtaining sub-module that is configured to obtain the indication information from the explicit indication signaling.

According to an embodiment of the disclosure, the explicit indication signaling is a downlink control signaling, the indication information is in a fixed or configurable information field of the downlink control signaling, and the information field has a fixed or configurable length. The first obtaining sub-module includes a second obtaining sub-module that is configured to obtain the indication information from the information field of the downlink control signaling.

According to an embodiment of the disclosure, the receiving module includes a second receiving sub-module that is configured to receive an implicit indication signaling from the base station, herein the implicit indication signaling includes a scrambling sequence used for representing the indication information, and a first determining sub-module that is configured to determine the indication information according to a defined rule and the scrambling sequence that is included in the implicit indication signaling.

According to an embodiment of the disclosure, the defined rule includes a correspondence between at least one designated scrambling sequence and designated indication information, and the defined rule is specified in a communication protocol, or is notified by the base station to the terminal in a predefined manner or by means of signaling notification.

According to an embodiment of the disclosure, the receiving module includes a third receiving sub-module that is configured to receive COT configuration information, which is used for implicitly representing the indication information, from the base station, and a second determining sub-module that is configured to determine the indication information according to the COT configuration information.

According to an embodiment of the disclosure, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

A fifth aspect according to the embodiments of the disclosure provides a non-transitory computer-readable storage medium having stored thereon a computer program that is used for performing the method in the first aspect that is used for identifying the downlink transmissions.

A sixth aspect according to the embodiments of the disclosure provides a non-transitory computer-readable storage medium having stored thereon a computer program that is used for performing the method in the second aspect that is used for identifying the downlink transmissions.

A seventh aspect according to the embodiments of the disclosure provides a device for identifying downlink transmissions applied to a base station, the device including a processor and a memory that is configured to store instructions executable by the processor. The processor can be configured to configure indication information used for identifying the downlink transmissions, and transmit the indication information to a terminal to enable the terminal to identify the downlink transmissions according to the indication information.

An eighth aspect according to the embodiments of the disclosure provides a device for identifying downlink transmissions applied to a terminal. The device can include a processor and a memory that is configured to store instructions executable by the processor. The processor can be configured to receive indication information used for identifying the downlink transmissions from a base station, and identify the downlink transmissions according to the indication information.

The technical solutions provided in the embodiments of the disclosure can have beneficial effects. For example, in the embodiments of the disclosure, the base station may configure the indication information used for identifying the downlink transmissions and transmit the indication information to the terminal so that the terminal identifies the downlink transmissions according to the indication information. Therefore, both an accuracy and an efficiency in identifying the downlink transmissions are improved.

In the embodiments of the disclosure, the terminal may receive the indication information used for identifying downlink transmissions from the base station and identify the downlink transmissions according to the indication information, so that both the accuracy and the efficiency in identifying the downlink transmissions are improved.

It is to be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The terms that appear in the disclosure are not intended to limit the disclosure but are used to describe particular embodiments. Terms, such as "a/an", "the" and "this" that appear before a singular noun in the claims of the disclosure and other parts of the disclosure also represent "more than one" unless other meanings are clearly indicated in the context. It is also to be understood that the term "and/or" used in the disclosure refers to and includes any or all possible combinations of one or more associated items that are listed.

It should be understood that although it is possible that the terms "first", "second" or "third" are used in the disclosure to describe all kinds of information, the information shall not be limited by the terms that are only used to make pieces of information of one type distinguished from each other. For example, in the event that the scope of the disclosure is not departed from, indication information may also be referred to as second information. Similarly, the second information may also be referred to as the indication information. Based the context, it can be explained that the word "if" used herein may be "when" or "in response to determining that".

Figure 1:
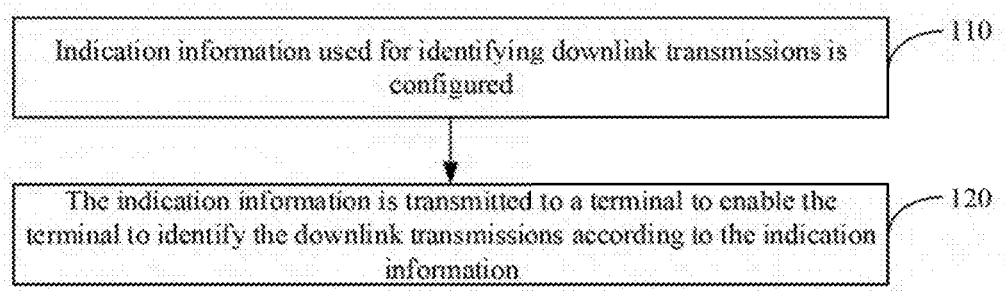
FIG. 1 is a flowchart of a method for identifying downlink transmissions according to an exemplary embodiment of the disclosure.
Figure 2:
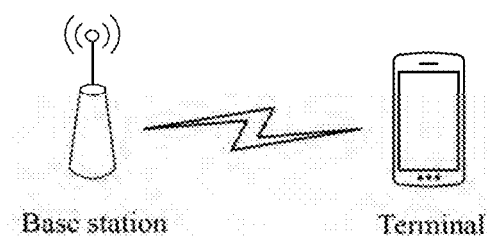
FIG. 2 is a schematic diagram showing an application scenario of a method for identifying downlink transmissions according to an exemplary embodiment of the disclosure.

FIG. 1 is a flowchart of a method for identifying downlink transmissions according to an exemplary embodiment of the disclosure. FIG. 2 is a schematic diagram showing an application scenario of a method for identifying downlink transmissions according to an exemplary embodiment of the disclosure. The method for identifying downlink transmissions may be applied to a base station. As illustrated in FIG. 1, the method for identifying downlink transmissions may include following operations 110-120.

In operation 110, indication information used for identifying the downlink transmissions is configured. In the embodiment of the disclosure, a mechanism of Listen Before Talk (LBT) is introduced for unlicensed frequency spectra. In other words, before transmitting data, a data transmitting end needs to determine whether a channel on which the data is to be transmitted is idle or not, and the data transmitting end can transmit the data only when the channel is idle.

When the data transmitting end is a base station, the base station will transmit the data to a terminal after the base station determines according to be LBT mechanism that the channel is idle and successfully obtains the channel. The terminal needs to transmit Hybrid Automatic Repeat request (HARQ) feedback information for the data at a corresponding position.

Since some services have an exacting requirement on the delay, the terminal is required to provide the HARQ feedback in a COT. However, since it is possible that multiple uplink-downlink switching points exist in a COT, the base station may configure indication information used for identifying the downlink transmissions firstly and then transmit the indication information to the terminal, so that the terminal may identify different uplink transmission according to the indication information and get an accurate measurement result when performing measurement such as Channel State Information (CSI) measurement.

In an exemplary embodiment, the indication information may include a first indication state or a second indication state. The first indication state is used for indicating that no changes occur in a current downlink transmission, and the second indication state is used for indicating that the current downlink transmission is a new downlink transmission. For example, "0" stands the first indication state and "1" stands for the second indication state. The fact that no changes occur in a current downlink transmission may indicate that the current downlink transmission and a previous downlink transmission are within a same COT. For example, the previous downlink transmission is within COT1 and the current downlink transmission is also within COT1. The fact that the current downlink transmission is a new downlink transmission may indicate that the current downlink transmission and the previous downlink transmission are within different COTs. For example, the previous downlink transmission is within COT1 but the current downlink transmission is within COT2.

In an embodiment, the indication information may include serial number information used for representing the current downlink transmission. The serial number information may be a serial number of the COT.

In operation 120, the indication information is transmitted to a terminal to enable the terminal to identify the downlink transmissions according to the indication information. In the embodiment of the disclosure, the base station transmits the indication information to the terminal for the purpose of enabling the terminal to determine whether different downlink transmissions are within a same COT according to the indication information.

An exemplary scenario illustrated in FIG. 2 involves a base station and a terminal. The base station may first configure indication information that is used for identifying the downlink transmissions, and then transmit the indication information to the terminal, so that the terminal may identify different downlink transmissions according to the indication information and obtain an accurate result in measurement.

As can be seen from above embodiment, the indication information used for identifying the downlink transmissions may be configured and transmitted to the terminal to enable the terminal to identify the downlink transmissions according to the indication information, so that identifying the downlink transmissions is made more accurate and effective.

Figure 3:
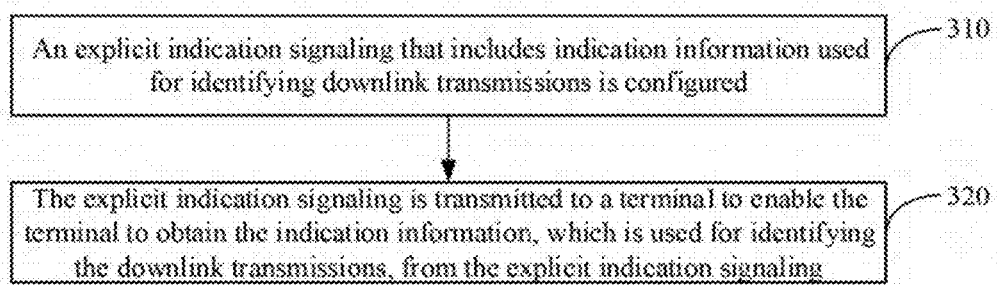
FIG. 3 is a flowchart of another method for identifying downlink transmissions according to an exemplary embodiment of the disclosure.

FIG. 3 is a flowchart of another method for identifying downlink transmissions according to an exemplary embodiment of the disclosure. The method for identifying downlink transmissions may be applied to a base station and is based on the method illustrated in FIG. 1. As illustrated in FIG. 3, operation 120 may include following operations 310 to 320.

In operation 310, an explicit indication signaling that includes indication information used for identifying the downlink transmissions is configured. In the embodiment of the disclosure, the explicit indication signaling may explicitly indicate the indication information used for identifying the downlink transmissions. In an embodiment, the explicit indication signaling may be a downlink control signaling. in the embodiment, the indication information is in a fixed or configurable information field of the downlink control signaling, and the information field has a fixed or configurable length.

Figure 3A:
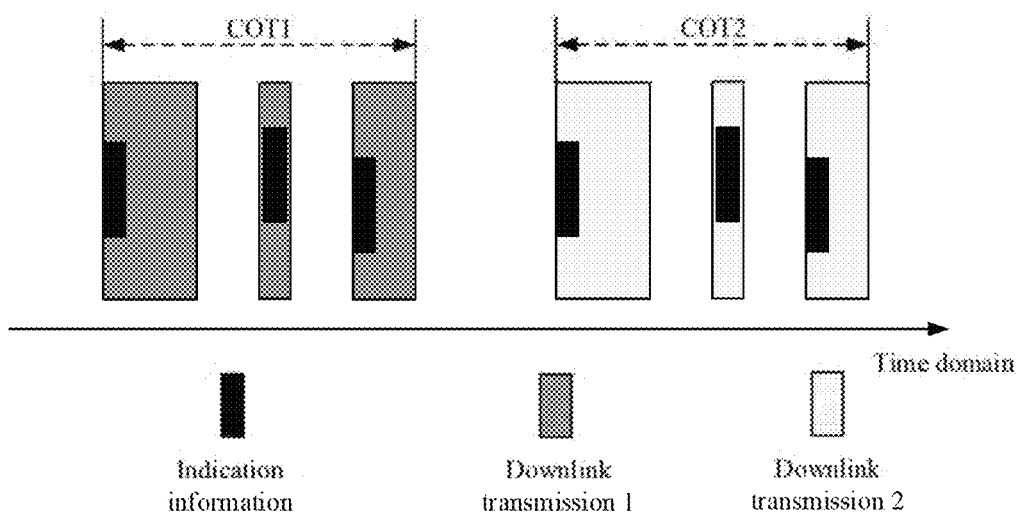
FIG. 3A is a schematic diagram of indication information according to an exemplary embodiment of the disclosure.

In operation 320, the explicit indication signaling is transmitted: to a terminal to enable the terminal to obtain the indication information, Which is used for identifying the downlink transmissions, from the explicit indication signaling. In the embodiment of the disclosure, the base station may notify the terminal of the indication information used for identifying the downlink transmissions through the explicit indication signaling. As illustrated in FIG. 3A, for different downlink transmissions in each COT, the base station may transmit the downlink control signaling that includes the indication information used for identifying the downlink transmissions to the terminal and then the terminal identifies different downlink transmissions based on the indication information. For example, indication information for each of downlink transmissions 1 in COT1 may be a serial number "1" of COT1, and indication information of each of downlink transmissions 2 may be a serial number "2" of COT2.

As can be seen from above embodiment, the terminal may be notified of the indication information by way of explicit indication so that flexibility and reliability of the transmission of the indication information is improved.

Figure 4:
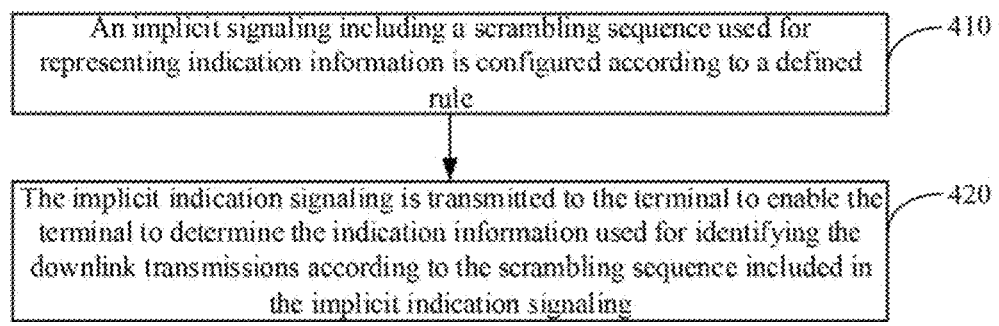
FIG. 4 is a flowchart of another method for identifying downlink transmissions according to an exemplary embodiment of the disclosure.

FIG. 4 is a flowchart of another method for identifying downlink transmissions according to an exemplary embodiment of the disclosure. The method for identifying downlink transmissions may be applied to a base station and is based on the method illustrated in FIG. 1. As illustrated in FIG. 4, operation 120 may include following operations 410 to 420.

In operation 410, an implicit indication signaling including a scrambling sequence used for representing indication information is configured according to a defined rule. In the embodiment of the disclosure, the implicit indication signaling may implicitly indicate the indication information used for identifying the downlink transmissions. The implicit indication signaling may be a downlink control signaling that is scrambled through a scrambling sequence used for representing the indication information. The implicit indication signaling is used to enable the terminal to determine the corresponding indication information according to the scrambling sequence.

In an embodiment, the defined rule may include a correspondence between at least one designated scrambling sequence and designated indication information. The defined rule may be specified in a communication protocol, or configured by the base station and notified to the terminal through a designated signaling. For example, a scrambling sequence 1 is used for representing "0" and a scrambling sequence 2 is used for representing "1".

In an embodiment, the method for identifying downlink transmissions may also include that the defined rule is transmitted to the terminal in a predefined manner or by means of signaling notification.

In operation 420, the implicit indication signaling is transmitted to the terminal to enable the terminal to determine the indication information used for identifying the downlink transmissions according to the scrambling sequence included in the implicit indication signaling. As can be seen from the above embodiment, the terminal may be notified or the indication information by way of implicit indication so that a signaling overhead of the indication information is reduced.

Figure 5:
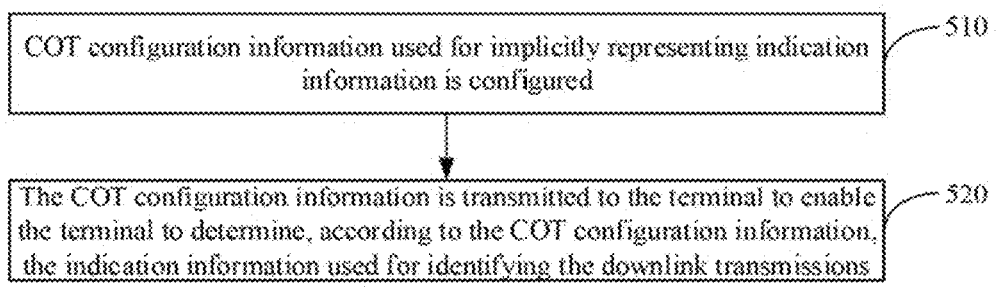
FIG. 5 is a flowchart of another method for identifying downlink transmissions according to an exemplary embodiment of the disclosure.

FIG. 5 is a flowchart of another method for identifying downlink transmissions according to an exemplary embodiment of the disclosure. The method for identifying downlink transmissions may be applied to a base station and is based on the method illustrated in FIG. 1. As illustrated in FIG. 5, operation 120 may include following operations 510 to 520.

In operation 510, COT configuration information used for implicitly representing indication information is configured. In an embodiment, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

In operation 520, the COT configuration information is transmitted to the terminal to enable the terminal to determine, according to the COT configuration information, the indication information used for identifying the downlink transmissions. In the embodiment of the disclosure, the base station may transmit the COT configuration information to the terminal before each COT begins, or notify the terminal of configuration information of each COT in advance. In this way, the terminal may implicitly identify different downlink transmissions based on the COT configuration information transmitted by the base station. For example, as illustrated in FIG. 5, before COT1 begins, the base station transmits the COT configuration information corresponding to COT1 to the terminal. Likewise, before COT2 begins, the base station may transmit the COT configuration information corresponding to COT2 to the terminal.

As can be seen from the above embodiment, the terminal may be implicitly notified of the indication information used tor identifying the downlink transmissions through the COT configuration information so that the manners for identifying the downlink transmissions become more diversified and identifying the downlink transmissions is made more applicable.

Figure 6:
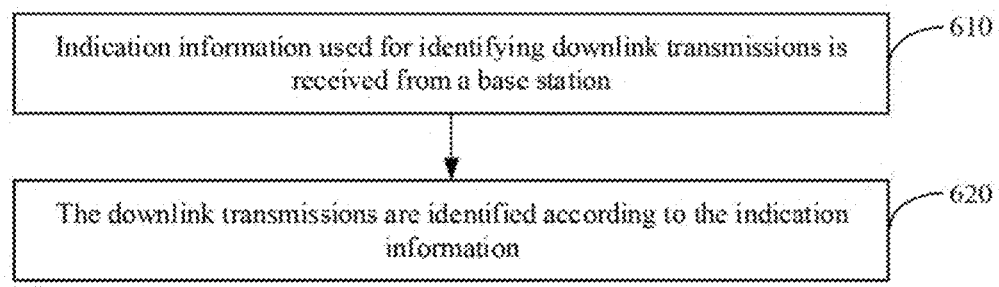
FIG. 6 is a flowchart of a method for identifying downlink transmissions according to an exemplary embodiment of the disclosure.

FIG. 6 is a flowchart of a method for identifying downlink transmissions according to an exemplary embodiment of the disclosure. The method for identifying downlink transmissions may be applied to a terminal. As illustrated in FIG. 6, the method for identifying downlink transmissions may include following operations 610 to 620.

In operation 610, indication information used for identifying the downlink transmissions is received from a base station.

In operation 620, the downlink transmissions are identified according to the indication information.

In an embodiment, the indication information may include a first indication state or a second indication state. The first indication state is used for indicating that no changes occur in a current downlink transmission, and the second indication state is used for indicating that the current downlink transmission is a new downlink transmission. Operation 620 may include following operations.

In response to that the indication information is the first indication state, it is determined that no changes occur in the current downlink transmission, which means both the current downlink transmission and a previous downlink transmission are within a same COT.

In response to that the indication information is the second indication state, it is determined that the current downlink transmission is the new downlink transmission, which means the current downlink transmission and the previous downlink transmission are within different COTs.

In an embodiment, the indication information includes serial number information used for representing the current downlink transmission and operation 620 may include following operations.

In response to that serial number information of the current downlink transmission is same as serial number information of the previous downlink transmission, it is determined that no changes occur in the current downlink transmission, which means both the current downlink transmission and the previous downlink transmission are within a same COT.

In response to that the serial number information of the current downlink transmission is different from the serial number information of the previous downlink transmission, it is determined that the current downlink transmission is the new downlink transmission, which means the current downlink transmission and the previous downlink transmission are within different COTs.

As can be seen from the above embodiment, the indication information used for identifying the downlink transmissions may be received from the base station and then the downlink transmissions may be identified according to the indication information, thereby improving an accuracy and an efficiency of identifying the downlink transmissions.

Figure 7:
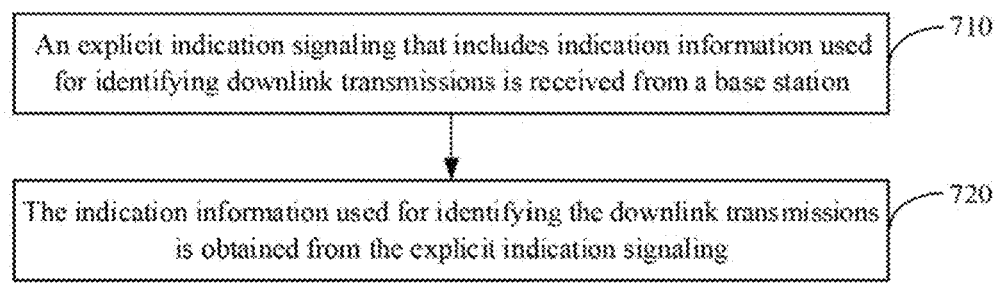
FIG. 7 is a flowchart of another method for identifying downlink transmissions according to an exemplary embodiment of the disclosure.

FIG. 7 is a flowchart of another method for identifying downlink transmissions according to an exemplary embodiment of the disclosure. The method for identifying downlink transmissions may be applied to a terminal and is based on the method illustrated in FIG. 6. As illustrated FIG. 7, operation 610 may include following operations 710 to 720.

In operation 710, an explicit indication signaling that includes indication information used for identifying the downlink transmissions is received from a base station.

In operation 720, the indication information used for identifying the downlink transmissions is obtained from the explicit indication signaling.

In an embodiment, the explicit indication signaling may be a downlink control signaling. In the embodiment, the indication information is in a fixed or configurable information field of the downlink control signaling, and the information field has a fixed or configurable length. When operation 720 is performed, the indication information may be obtained from the information field of the downlink control signaling.

As can be seen from the above embodiment, the indication information used for identifying the downlink transmissions may be obtained from the explicit indication signaling so that flexibility and reliability of the transmission of the indication information is improved.

Figure 8:
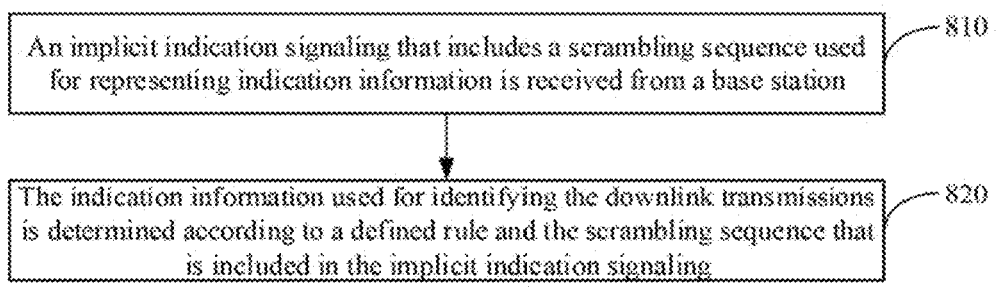
FIG. 8 is a flowchart of another method for identifying downlink transmissions according to an exemplary embodiment of the disclosure.

FIG. 8 is a flowchart of another method for identifying downlink transmissions according to an exemplary embodiment of the disclosure. The method for identifying downlink transmissions may be applied to a terminal and is based on the method illustrated in FIG. 6. As illustrated in FIG. 8, operation 610 may include following operations 810 to 820.

In operation 810, an implicit indication signaling that includes a scrambling sequence used for representing indication information is received from a base station.

In operation 820, the indication information used for identifying the downlink transmissions is determined according to a defined rule and the scrambling sequence that is included in the implicit indication signaling.

In an embodiment, the defined rule involved in operation 820 may include a correspondence between at least one designated scrambling sequence and designated indication information. And the defined rule is specified in a communication protocol, or is notified by the base station to the terminal in a predefined manner or by means of signaling notification.

As can be seen from the above embodiment, the indication information used for identifying the downlink transmissions may be determined according to the implicit indication signaling so that the indication information is obtained more accurately and is transmitted in a safer way.

Figure 9:
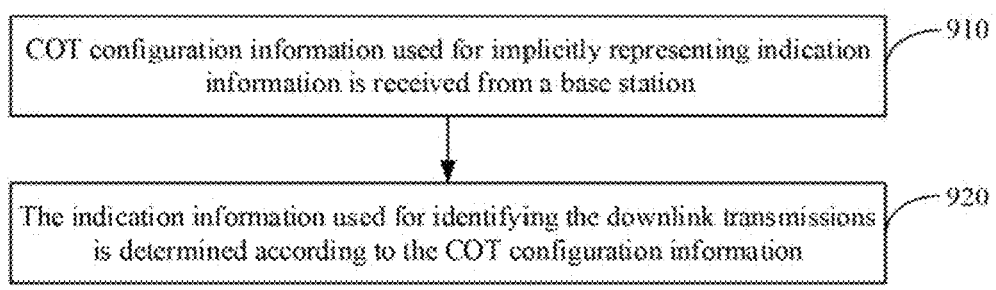
FIG. 9 is a flowchart of another method for identifying downlink transmissions according to an exemplary embodiment of the disclosure.

FIG. 9 is a flowchart of another method for identifying downlink transmissions according to an exemplary embodiment of the disclosure. The method for identifying downlink transmissions may be applied to a terminal and is based on the method illustrated in FIG. 6. As illustrated in FIG. 9, operation 610 may include operations 910 to 920.

In operation 910, COT configuration information used for implicitly representing indication information is received from a base station.

In an embodiment, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

In operation 920, the indication information used for identifying the downlink transmissions is determined according to the COT configuration information.

Figure 5A:
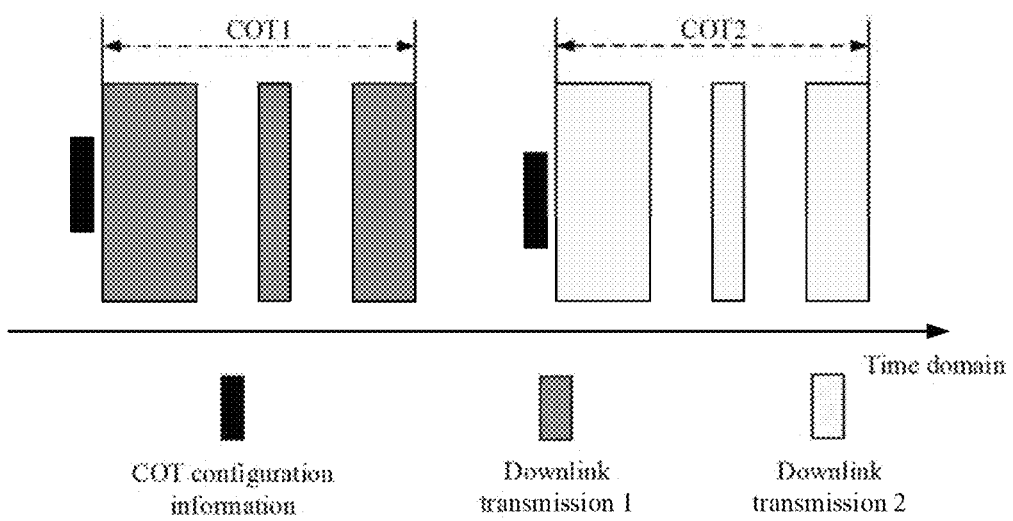
FIG. 5A is a schematic diagram of COT configuration information according to an exemplary embodiment of the disclosure.

As illustrated in FIG. 5A, before COT1 begins, the base station transmits COT configuration information corresponding to COT1 to the terminal so that the terminal may identify 3 downlink transmissions 1 according to the COT configuration information. Likewise, before COT2 begins, the base station transmits COT configuration information corresponding to COT2 to the terminal so that the terminal may identify 3 downlink transmissions 2 according to the COT configuration information.

As can be seen from the above embodiment, the indication information used for identifying the downlink transmissions may be determined according to the COT configuration information so that the manners for identifying the downlink transmissions become more diversified and identifying the downlink transmissions is made more applicable. An embodiment of a device for identifying the downlink transmissions is also provided in the disclosure. The embodiment of the device corresponds to the aforementioned embodiment of the method for identifying downlink transmissions.

Figure 10:
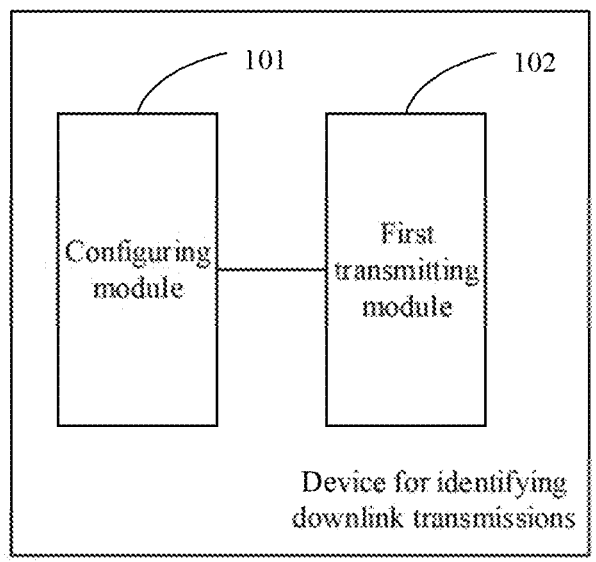
FIG. 10 is a block diagram of a device for identifying downlink transmissions according to an exemplary embodiment of the disclosure.

FIG. 10 is a block diagram of a device for identifying downlink transmissions according to an exemplary embodiment of the disclosure. The device is applied to a base station and is configured to perform the method for identifying downlink transmissions illustrated in FIG. 1. As illustrated in FIG. 10, the device for identifying the downlink transmissions may include a configuring module 101 and a first transmitting module 102.

The configuring module 101 is configured to configure indication information used for identifying the downlink transmissions.

The first transmitting module 102 is configured to transmit the indication information to the terminal to enable the terminal to identify the downlink transmissions according to the indication information.

As can be seen from the above embodiment, the indication information used for identifying the downlink transmissions may be configured and transmitted to the terminal to enable the terminal to identify the downlink transmissions according to the indication information so that identifying the downlink transmissions is made more accurate and effective.

In an embodiment, based on the device illustrated in FIG. 10, the indication information includes a first indication state or a second indication state; the first indication state is used for indicating that no changes occur in a current downlink transmission, and the second indication state is used for indicating that the current downlink transmission is a new downlink transmission.

In an embodiment, based on the device illustrated in FIG. 10, the indication information includes serial number information used for representing a current downlink transmission.

Figure 11:
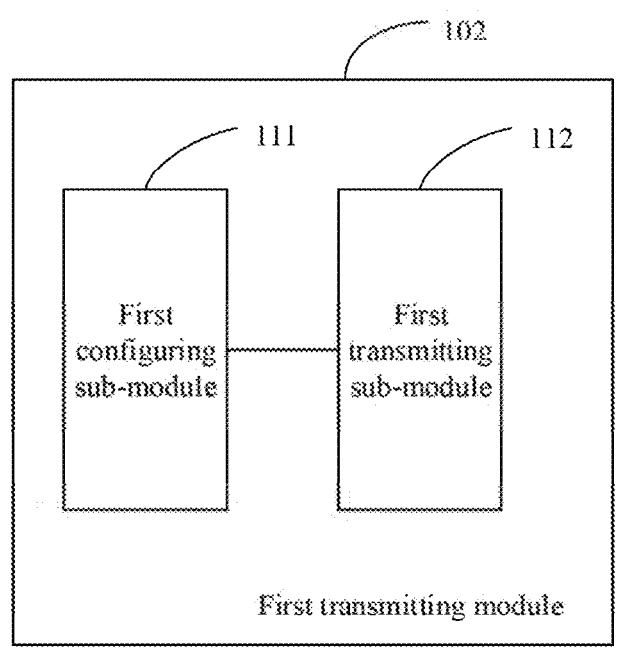
FIG. 11 is another block diagram of a device for identifying downlink transmissions according to an exemplary embodiment of the disclosure.

In an embodiment, as illustrated in FIG. 11, based on the device illustrated in FIG. 10, the first transmitting module 102 may include a first configuring sub-module 111 and a first transmitting sub-module 112.

The first configuring sub-module 111 is configured to configure an explicit indication signaling including the indication information.

The first transmitting sub-module 112 is configured to transmit the explicit indication signaling to the terminal to enable the terminal to obtain the indication information from the explicit indication signaling.

In an embodiment, based on the device illustrated in FIG. 11, the explicit indication signaling is a downlink control signaling, the indication information is in a fixed or configurable information field of the downlink control signaling, and the information field has a fixed or configurable length.

As can be seen from above embodiment, the terminal may be notified of the indication information by way of explicit indication so that flexibility and reliability of the transmission of the indication information is improved.

Figure 12:
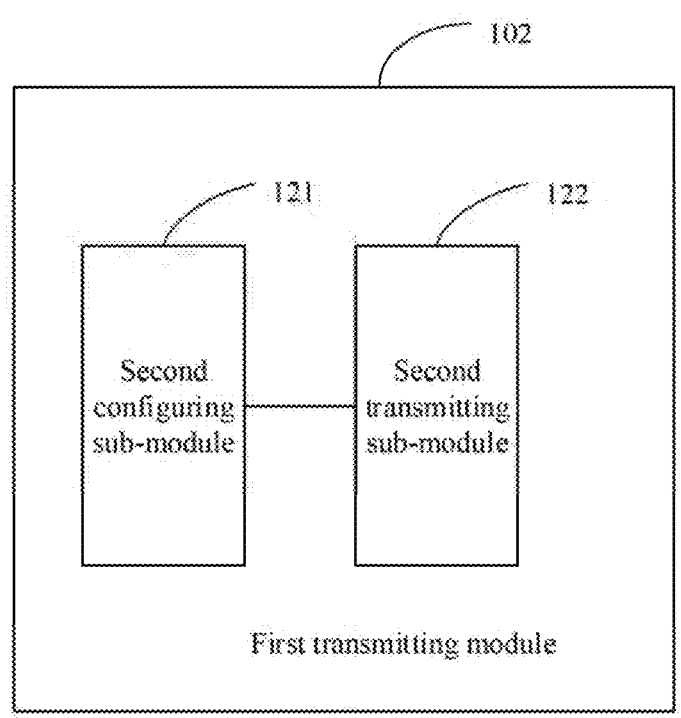
FIG. 12 is another block diagram of a device for identifying downlink transmissions according to an exemplary embodiment of the disclosure.

In an embodiment, as illustrated in FIG. 12, based on the device illustrated in FIG. 10, the first transmitting module 102 may include a second configuring sub-module 121 and a second transmitting sub-module 122.

The second configuring sub-module 121 is configured to configure an implicit indication signaling according to a defined rule. The implicit indication signaling includes a scrambling sequence used for representing the indication information.

The second transmitting sub-module 122 is configured to transmit the implicit indication signaling to the terminal to enable the terminal to determine the indication information according to the scrambling sequence included in the implicit indication signaling.

In an embodiment, based on the device illustrated in FIG. 12, the defined rule includes a correspondence between at least one designated scrambling sequence and designated indication information. In addition, the device for identifying the downlink transmissions may further include a second transmitting module. The second transmitting module is configured to transmit the defined rule to the terminal in a predefined manner or by means of signaling notification.

As can be seen from the above embodiment, the terminal may be notified of the indication information by way of implicit indication so that a signaling overhead of the indication information is reduced.

Figure 13:
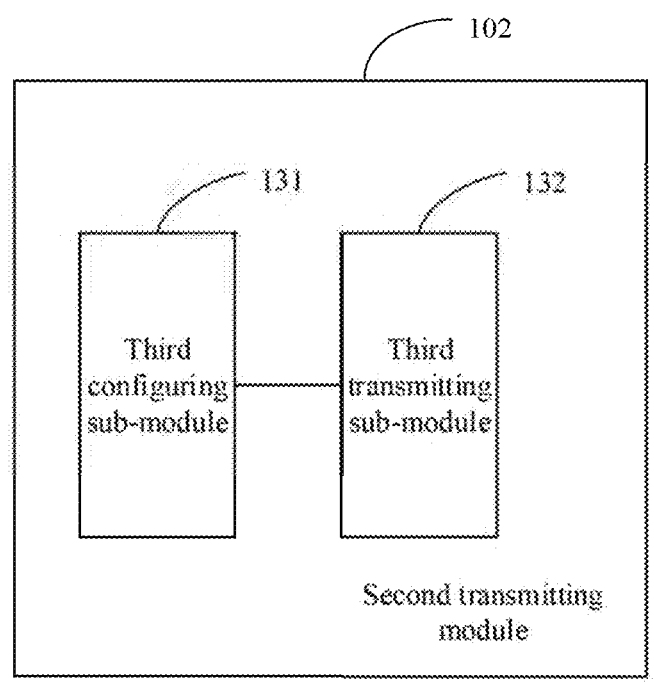
FIG. 13 is another block diagram of a device for identifying downlink transmissions according to an exemplary embodiment of the disclosure.

In an embodiment, as illustrated in FIG. 13, based on the device illustrated in FIG. 10, the first transmitting module 102 may include a third configuring sub-module 131 and a third transmitting sub-module 132. The third configuring sub-module 131 is configured to configure COT configuration information that is used for implicitly representing the indication information. The third transmitting sub-module 132 is configured to transmit the COT configuration information to the terminal to enable the terminal to determine the indication information according to the COT configuration information.

In an embodiment, based on the device illustrated in FIG. 13, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

As can be seen from the above embodiment, the terminal may be implicitly notified of the indication information used for identifying the downlink transmissions through the COT configuration information so that the manners for identifying the downlink transmissions become more diversified and identifying the downlink transmissions is made more applicable.

Figure 14:
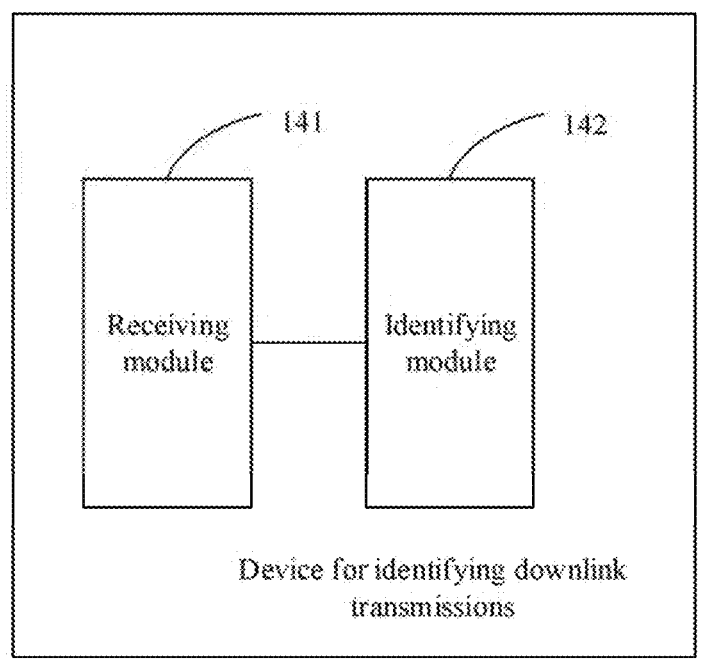
FIG. 14 is a block diagram of a device for identifying downlink transmissions according to an exemplary embodiment of the disclosure.

FIG. 14 is a block diagram of a device for identifying downlink transmissions according to an exemplary embodiment of the disclosure. The device is applied to a base station and is configured to perform the method for identifying downlink transmissions illustrated in FIG. 6. As illustrated in FIG. 14, the device for identifying the downlink transmissions may include a receiving module 141 and an identifying module 142.

The receiving module 141 is configured to receive indication information used for identifying the downlink transmissions from a base station. The identifying module 142 is configured to identify the downlink transmissions according to the indication information.

As can be seen from the above embodiment, the indication information used for identifying the downlink transmissions may be received from the base station and then the downlink transmissions may be identified according to the indication information, thereby improving an accuracy and an efficiency of identifying the downlink transmissions.

Figure 15:
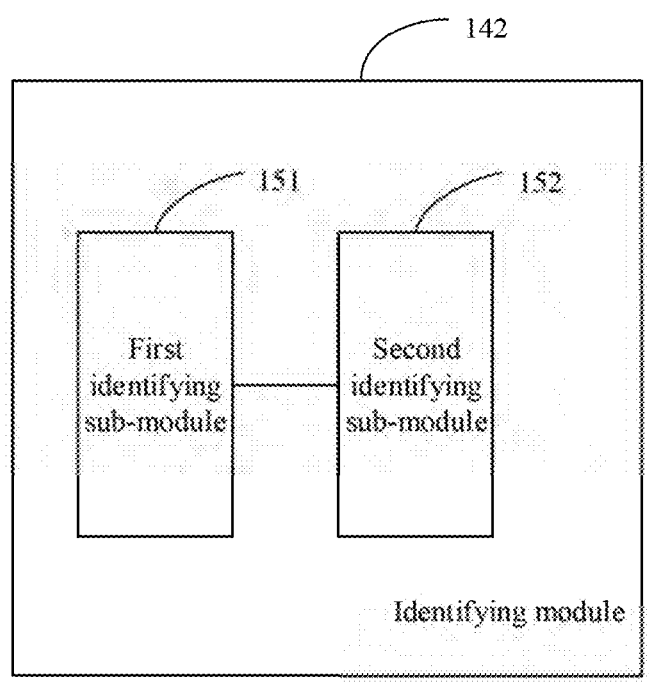
FIG. 15 is another block diagram of a device for identifying downlink transmissions according to an exemplary embodiment of the disclosure.

In an embodiment, based on the device illustrated in FIG. 14, the indication information includes a first indication state or a second indication state. The first indication state is used for indicating that no changes occur in a current downlink transmission, and the second indication state is used for indicating that the current downlink transmission is a new downlink transmission. As illustrated in FIG 15, the identifying module 142 may include a first identifying sub-module 151 and a second identifying sub-module 152.

The first identifying sub-module 151, is configured to in response to that the indication information is the first indication state, determine that no changes occur in the current downlink transmission. The second identifying sub-module 152 is configured to, in response to that the indication information is the second indication state, determine that the current downlink transmission is the new downlink transmission.

Figure 16:
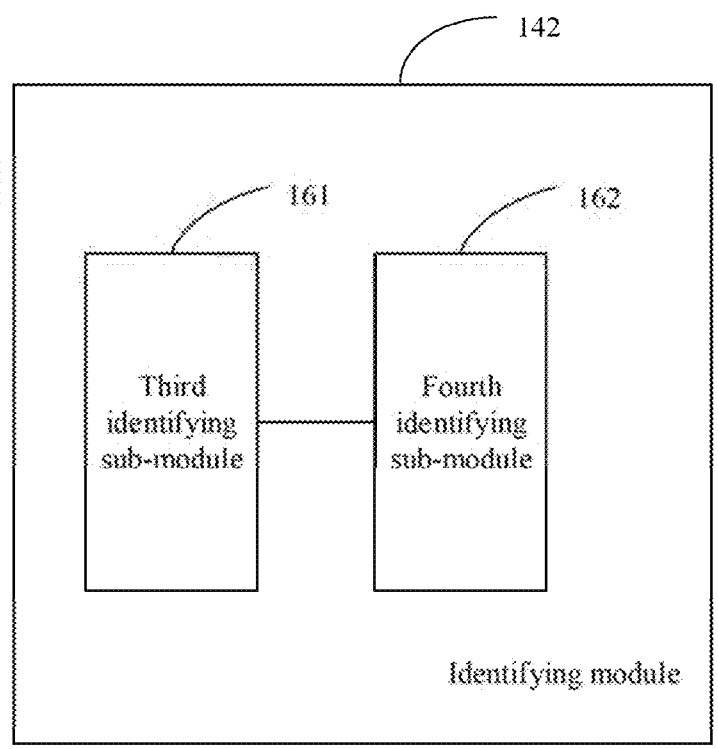
FIG. 16 is another block diagram of a device for identifying downlink transmissions according to an exemplary embodiment of the disclosure.

In an embodiment, as illustrated in FIG. 16, based on the device illustrated in FIG. 14, the indication information includes serial number information used for representing a current downlink transmission. The identifying module 142 may include a third identifying sub-module 161 and a fourth identifying sub-module 162.

The third identifying sub-module 161 is configured to in response to that the serial number information of the current downlink transmission is same as serial number information of a previous downlink transmission, determine that no changes occur in the current downlink transmission. The fourth identifying sub-module 162 is configured to, in response to that the serial number information of the current downlink transmission is different from the serial number information of the previous downlink transmission, determine that the current downlink transmission is the new downlink transmission.

Figure 17:
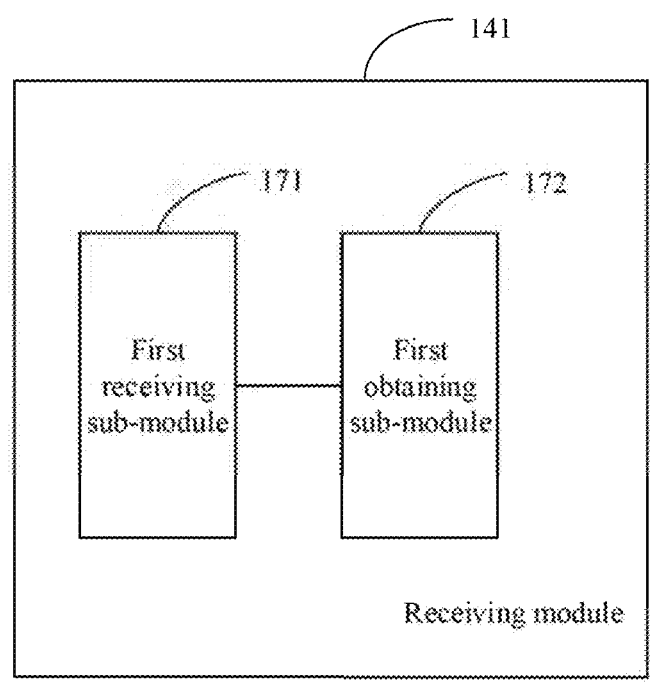
FIG. 17 is another block diagram of a device for identifying downlink transmissions according to an exemplary embodiment of the disclosure.

In an embodiment, as illustrated in FIG. 17, based on the device illustrated in FIG. 14, the receiving module 141 may include a first receiving sub-module 171 and a first obtaining sub-module 172.

The first receiving sub-module 171 is configured to receive an explicit indication signaling from the base station. The explicit indication signaling includes the indication information. The first obtaining sub-module 172 is configured to: obtain the indication information from the explicit indication signaling.

Figure 18:
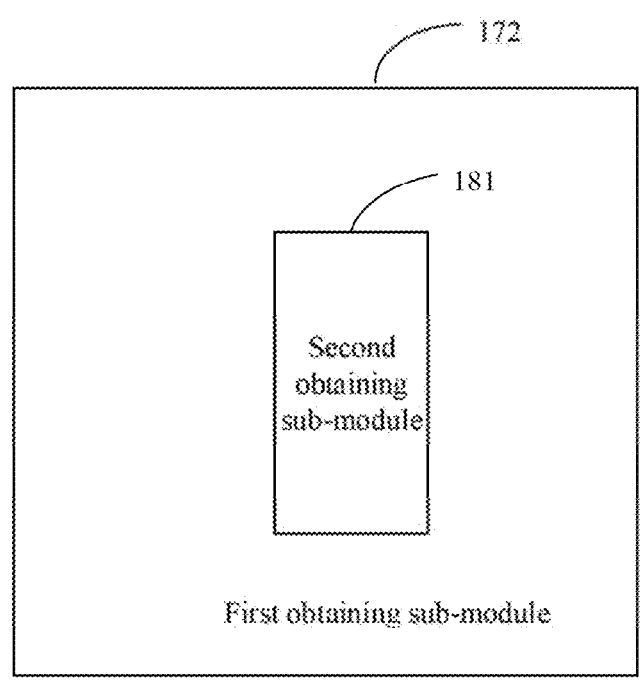
FIG. 18 is another block diagram of a device for identifying downlink transmissions according to an exemplary embodiment of the disclosure.

In an embodiment, as illustrated in FIG. 18, based on the device illustrated in FIG. 17, the explicit indication signaling is a downlink control signaling. The indication information is in a fixed or configurable information field of the downlink control signaling, and the information field has a fixed or configurable length. The first obtaining sub-module 172 may include a second obtaining sub-module 181.

The second obtaining sub-module 181 is configured to: obtain the indication information from the information field of the downlink control signaling.

As can be seen from the above embodiment, the indication information used for identifying the downlink transmissions may be obtained from the explicit indication signaling so that flexibility and reliability of the transmission of the indication information is improved.

Figure 19:
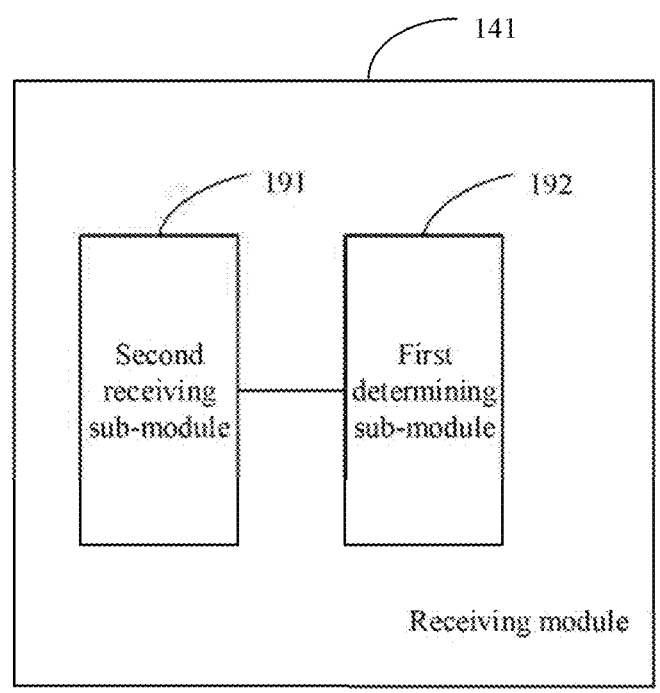
FIG. 19 is another block diagram of a device for identifying downlink transmissions according to an exemplary embodiment of the disclosure.

In an embodiment, as illustrated in FIG. 19, based on the device illustrated in FIG. 14, the receiving module 141 may include a second receiving sub-module 191 and a first determining sub-module 192.

The second receiving sub-module 191 is configured to receive an implicit indication signaling from the base station. The implicit indication signaling includes a scrambling sequence used for representing the indication information. The first determining sub-module 192 is configured to determine the indication information according to a defined rule and the scrambling sequence included in the implicit indication signaling.

In an embodiment, based on the device illustrated in FIG. 19, the defined rule includes a correspondence between at least one designated scrambling sequence and designated indication information, and the defined rule is specified in a communication protocol, or is notified by the base station to the terminal in a predefined manner or by means of signaling notification.

As can be seen from the above embodiment, the indication information used for identifying the downlink transmissions may be determined according to the implicit indication signaling so that the indication information is obtained more accurately and is transmitted in a safer way.

Figure 20:
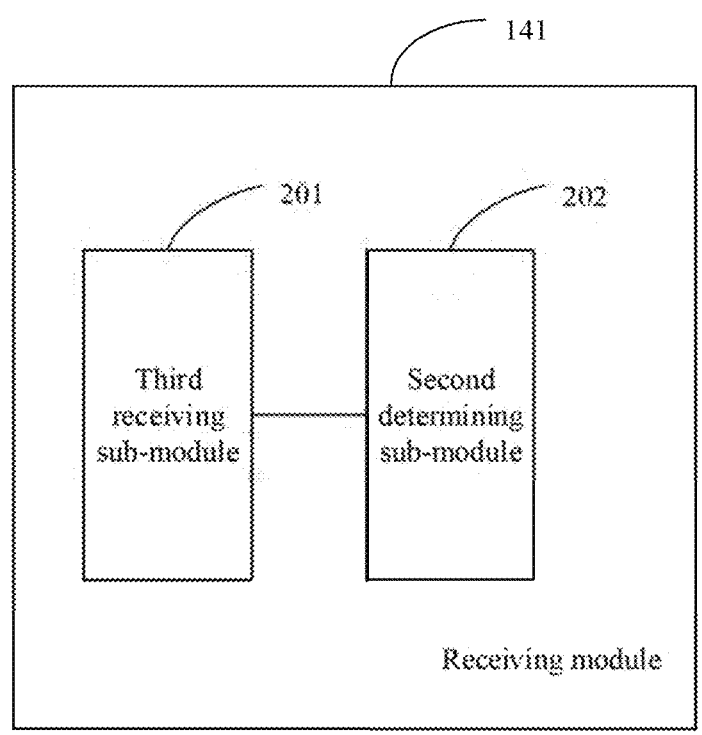
FIG. 20 is another block diagram of a device for identifying downlink transmissions according to an exemplary embodiment of the disclosure.

In an embodiment, as illustrated in FIG. 20, based on the device illustrated in FIG. 14, the receiving module 141 may include a third receiving sub-module 201 and a second determining sub-module 202.

The third receiving sub-module 201 is configured to receive COT configuration information, which is used for implicitly representing the indication information, from the base station. The second determining sub-module 202 is configured to determine the indication information according to the COT configuration in formation.

In an embodiment, based on the device illustrated in FIG. 20, the COT configuration information includes at least one of: a beginning position of a current COT and temporal length information of the current COT; the beginning position of the current COT and an ending position of the current COT; the beginning position of the current COT, the temporal length information of the current COT and power information of a pilot used for performing measurement; or the beginning position of the current COT, the ending position of the current COT, and the power information of the pilot used for performing measurement.

As can be seen from the above embodiment, indication information used for identifying the downlink transmissions may be determined according to the COT configuration information so that the manners for identifying the downlink transmissions become more diversified and identifying the downlink transmissions is made more applicable.

Since the device embodiments correspond to the method embodiments for the most part, some parts of the descriptions of the method embodiments can be referred to for the parts of the device embodiments that are related to the method embodiments. The device embodiments described above are only schematic. The units described above as separate parts may or may not be physically separated. Parts displayed as units may or may not be physical units, and may be located in the same place, or be distributed across multiple network units. Part or all of the modules in the device may be selected to achieve the purpose of the solutions of the disclosure according to a practical requirement. Those of ordinary skills in the art may understand and implement the solutions of the disclosure without doing creative works.

A non-transitory computer-readable storage medium having stored thereon computer programs is also provided in the disclosure. The computer programs are configured to perform any of the methods for identifying the downlink transmissions illustrated in FIG. 1 to FIG. 5.

A non-transitory computer-readable storage medium having stored thereon computer programs is also provided in the disclosure. The computer programs are configured to perform any of the methods for identifying the downlink transmissions illustrated in FIG. 1 to FIG. 9.

A device for identifying downlink transmissions is also provided in the disclosure and applied to a base station. The device include a processor and a memory configured to store instructions executable by the processor. The processor can be configured to configure indication information used for identifying the downlink transmissions, and transmit the indication information to the terminal to enable the terminal to identify the downlink transmissions according to the indication information.

Figure 21:
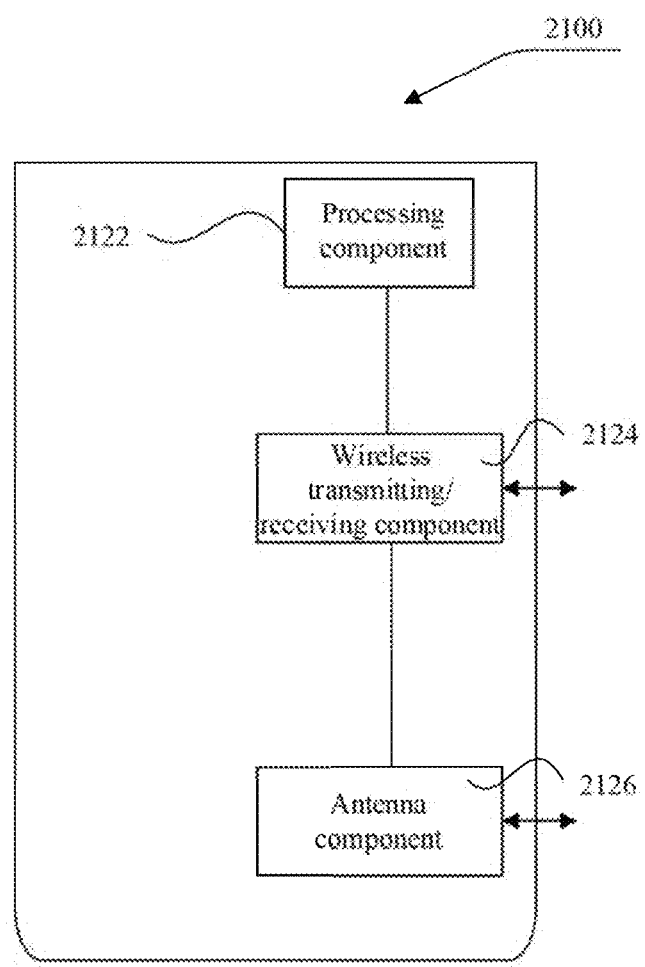
FIG. 21 is a schematic structural diagram of a device for identifying downlink transmissions according to an exemplary embodiment of the disclosure.

FIG. 21 is a schematic structural diagram of a device for identifying downlink transmissions according to an exemplary embodiment of the disclosure. A device 2100 may be provided as a base station. As illustrated in FIG. 21, the device 2100 includes a processing component 2122, a wireless transmitting/receiving component 2124, an antenna component 2126 and a specific signal processing part of a wireless interface. The processing component 2122 may further include one or more processors.

One of the processors in the processing component 2122 may be configured to perform any of the methods for identifying the downlink transmissions.

A device for identifying downlink transmissions is also provided in the disclosure and applied to a terminal. The device can include a processor and a memory configured to store instructions executable by the processor. The processor can be configured to receive indication information used for identifying the downlink transmissions from a base station, and identify the downlink transmissions according to the indication information.

Figure 22:
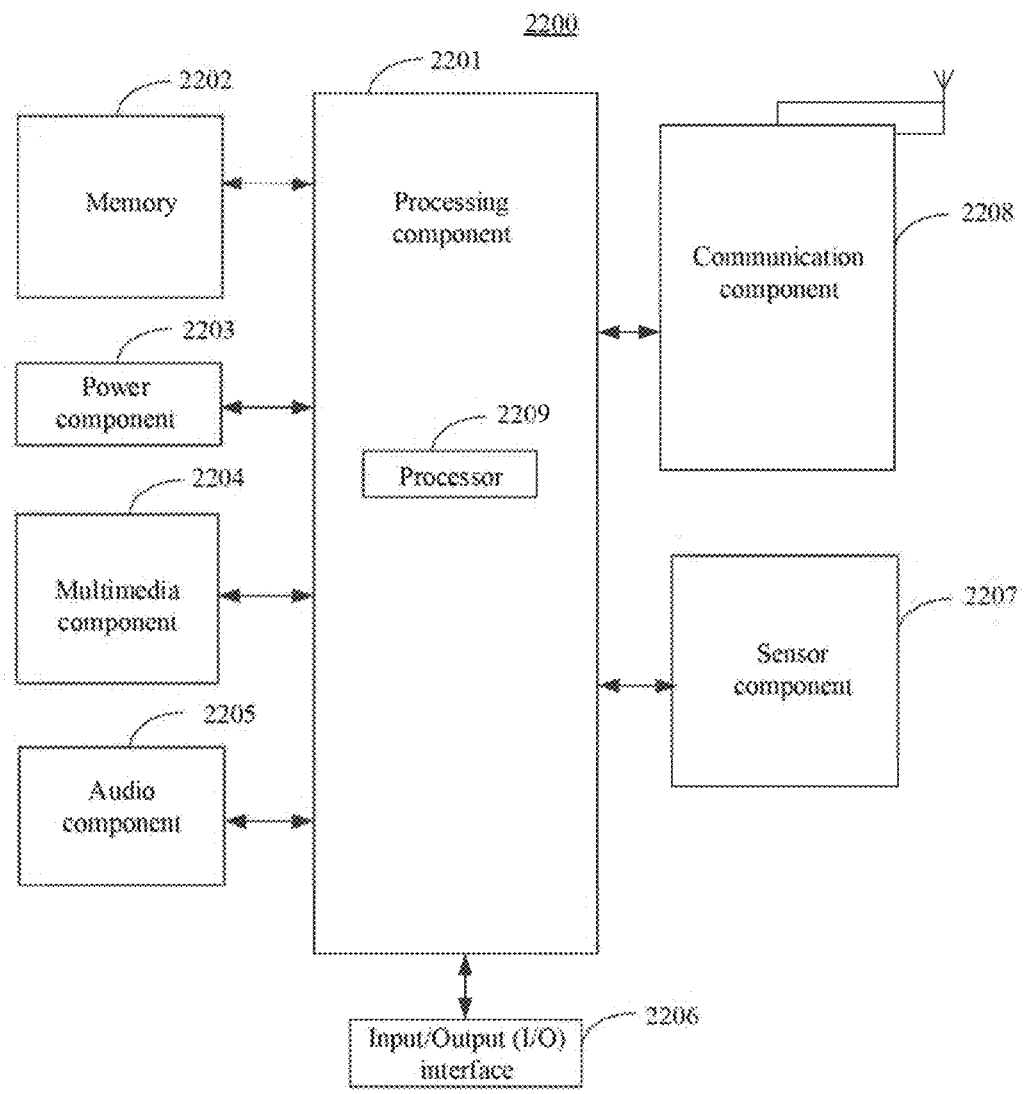
FIG. 22 is a schematic structural diagram of a device for identifying downlink transmissions according to an exemplary embodiment of the disclosure.

FIG. 22 is a schematic structural diagram of a device for identifying downlink transmissions according to an exemplary embodiment of the disclosure. FIG. 22 illustrates a device 2200 for identifying the downlink transmissions according to an exemplary embodiment. The device 2200 may be a terminal such as a computer, a mobile phone, a digital broadcast terminal, a messaging device, a gaming console, a tablet, a medical device, exercise equipment and a Personal Digital Assistant (PDA).

The device 2200 may include one or more of the following components; a processing component 2201, a memory 2202, a power component 2203, a multimedia component 2204, an audio component 2205, an Input/Output (I/O) interface 2206, a sensor component 2207, and a communication component 2208.

The processing component 2201 typically controls overall operations of the device 2200, such as the operations associated with display, telephone calls, data communications, camera operations, and recording operations. The processing component 2201 may include one or more processors 2209 to execute instructions to perform all or part of the operations in the abovementioned method. Moreover, the processing component 2201 may include one or more modules which facilitate interaction between the processing component 2201 and the other components. For instance, the processing component 2201 may include a multimedia module to facilitate interaction between the multimedia component 2204 and the processing component 2201.

The memory 2202 is configured to store various types of data to support the operation of the device 2200. Examples of such data include instructions for any application program or method operated on the device 2200, contact data, phonebook data, messages, pictures, video, and the like. The memory 2202 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 2203 provides power for various components of the device 2200. The power component 2203 may include a power management system, one or more power supplies, and other components associated with generation, management and distribution of power for the device 2200.

The multimedia component 2204 includes a screen providing an output interface between the device 2200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2204 includes a front camera and/or a rear camera. The front camera and/or the rear camera may receive external multimedia data when the device 2200 is in an operation mode, such as a photographing mode or a video mode. Each of the front camera and the rear camera may be a fixed optical lens system or have focusing and optical zooming capability.

The audio component 2205 is configured to output and/or input audio signals. For example, the audio component 2205 includes a Microphone (MIC), and the MIC is configured to receive an external audio signal when the device 2200 is in an operation mode, such as a call mode, a recording mode and a voice recognition mode. The received audio signal may further be stored in the memory 2202 or sent through the communication component 2208. In some embodiments, the audio component 2205 further includes a speaker configured to output the audio signal.

The I/O interface 2206 provides an interface between the processing component 2201 and a peripheral interface module, and the peripheral interface module may be a keyboard, a click wheel, a button and the like. The button may include, but not limited to: a home button, a volume button, a starting button and a locking button.

The sensor component 2207 includes one or more sensors configured to provide status assessment in various aspects for the device 2200. For instance, the sensor component 2207 may detect an on/off status of the device 2200 and relative positioning of components, such as a display and small keyboard of the device 2200, and the sensor component 2207 may further detect a change in a position of the device 2200 or a component of the device 2200, presence or absence of contact between the user and the device 2200, orientation or acceleration/deceleration of the device 2200 and a change in temperature of the device 2200. The sensor component 2207 may include a proximity sensor configured to detect presence of an object nearby without any physical contact. The sensor component 2207 may also include a light sensor, such as a Complementary Metal Oxide Semiconductor (CMOS) or Charge Coupled Device (CCD) image sensor, configured for use in an imagine application. In some embodiments, the sensor component 2207 may also include an acceleration sensor, a gyroscope sensor, a magnetic sensor, a pressure sensor or a temperature sensor.

The communication component 2208 is configured to facilitate wired or wireless communication between the device 2200 and another device. The device 2200 may access any communication-standard-based wireless network, such as a Wi-Fi network, a 2nd-Generation (2G) or 3rd-Generation (3G) network or a combination thereof. In an exemplary embodiment, the communication component 2208 receives a broadcast signal or broadcast associated information from an external broadcast management system through a broadcast channel. In an exemplary embodiment, the communication component 2208 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, as Bluetooth (BT) technology and another technology.

In an exemplary embodiment, the device 2200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above described methods.

In an exemplary embodiment, there is also provided a non-transitory computer readable storage medium including an instruction, such as the memory 2202 including an instruction, and the instruction may be executed by the processor 2209 of the device 2200 to implement the above described methods. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

When instructions in the storage medium are executed by the processor, the device 2200 is caused to perform any of the above methods for identifying the downlink transmissions.

Other implementations of the present disclosure will be apparent to those skilled in the art from consideration of the specification and practice of the present disclosure. The disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for identifying downlink transmissions that is applied to a base station, the method comprising:
    configuring indication information used for identifying the downlink transmissions; and
    transmitting the indication information to a terminal to enable the terminal to identify the downlink transmissions based on the indication information,
    wherein the indication information comprises a first indication state or a second indication state, wherein the first indication state is used for indicating a fact that no changes occur in a current downlink transmission, which indicates that the current downlink transmission and a previous downlink transmission are within a same Channel Occupancy Time (COT); and the second indication state is used for indicating a fact that the current downlink transmission is a new downlink transmission, which indicates that the current downlink transmission and the previous downlink transmission are within different COTs.

2. The method of claim 1, wherein the indication information further comprises serial number information used for representing a current downlink transmission.

3. The method of claim 1, wherein transmitting the indication information to the terminal comprises:
    configuring an explicit indication signaling including the indication information; and
    transmitting the explicit indication signaling to the terminal to enable the terminal to obtain the indication information from the explicit indication signaling.

4. The method of claim 3, wherein the explicit indication signaling is a downlink control signaling, the indication information is in a fixed or configurable information field of the downlink control signaling, and the information field has a fixed or configurable length.

5. The method of claim 1, wherein transmitting the indication information to the terminal further comprises:
configuring an implicit indication signaling according to a defined rule, the implicit indication signaling including a scrambling sequence used for representing the indication information; and
transmitting the implicit indication signaling to the terminal to enable the terminal to determine the indication information according to the scrambling sequence is included in the implicit indication signaling.

6. The method of claim 5, wherein the defined rule includes a correspondence between at least one designated scrambling sequence and designated indication information, and the method further comprises:
transmitting the defined rule to the terminal in a predefined manner or by means of signaling notification.

7. The method of claim 1, wherein transmitting the indication information to the terminal further comprises:
configuring COT configuration information that is used for implicitly representing the indication information; and
transmitting the COT configuration information to the terminal to enable the terminal to determine the indication information according to the COT configuration information.

8. The method of claim 7, wherein the COT configuration information comprises at least one of:
a beginning position of a current COT and temporal length information of the current COT;
the beginning position of the current COT and an ending position of the current COT;
the beginning position of the current COT, the temporal length information of the current COT and power information of a pilot used for performing measurement; or
the beginning position of the current COT, the ending position of the current COT and the power information of the pilot used for performing measurement.

9. A method for identifying downlink transmissions that is applied to a terminal, the method comprising:
receiving indication information used for identifying the downlink transmissions from a base station; and
identifying the downlink transmissions according to the indication information,
wherein the indication information comprises a first indication state or a second indication state, wherein the first indication state is used for indicating a fact that no changes occur in a current downlink transmission, which indicates that the current downlink transmission and a previous downlink transmission are within a same Channel Occupancy Time (COT); and the second indication state is used for indicating a fact that the current downlink transmission is a new downlink transmission, which indicates that the current downlink transmission and the previous downlink transmission are within different COTs.

10. The method of claim 9, wherein:
identifying the downlink transmissions according to the indication information further includes determining that:
no changes occur in the current downlink transmission when the indication information is the first indication state; and
the current downlink transmission is the new downlink transmission when the indication information is the second indication state.

11. The method of claim 9, wherein:
the indication information further includes serial number information used for representing a current downlink transmission, and
identifying the downlink transmissions according to the indication information further comprises determining that:
no changes occur in the current downlink transmission when the serial number information of the current downlink transmission is same as serial number information of a previous downlink transmission; and
the current downlink transmission is a new downlink transmission when the serial number information of the current downlink transmission is different from the serial number information of the previous downlink transmission.

12. The method of claim 9, wherein receiving the indication information used for identifying the downlink transmissions from the base station comprises:
receiving an explicit indication signaling from the base station, the explicit indication signaling including the indication information; and
obtaining the indication information from the explicit indication signaling.

13. The method of claim 12, wherein:
the explicit indication signaling is a downlink control signaling, the indication information is in a fixed or configurable information field of the downlink control signaling, and the information field has a fixed or configurable length, and
obtaining the indication information from the explicit indication signaling comprises obtaining the indication information from the information field of the downlink control signaling.

14. The method of claim 9, wherein receiving the indication information used for identifying the downlink transmissions from the base station further comprises:
receiving an implicit indication signaling from the base station, the implicit indication signaling including a scrambling sequence used for representing the indication information; and
determining the indication information according to a defined rule and the scrambling sequence that is included in the implicit indication signaling.

15. The method of claim 14, wherein the defined rule comprises a correspondence between at least one designated scrambling sequence and designated indication information, and the defined rule is specified in a communication protocol, or is notified by the base station to the terminal in a predefined manner or by means of signaling notification.

16. The method of claim 9, wherein receiving the indication information used for identifying the downlink transmissions from the base station further comprises:
receiving COT configuration information, which is used for implicitly representing the indication information, from the base station; and
determining the indication information according to the COT configuration information.

17. The method of claim 16, wherein the COT configuration information comprises at least one of:

a beginning position of a current COT and temporal length information of the current COT;

the beginning position of the current COT and an ending position of the current COT;

the beginning position of the current COT, the temporal length information of the current COT and power information of a pilot used for performing measurement; or the beginning position of the current COT, the ending position of the current COT, and the power information of the pilot used for performing measurement.

18. A device for identifying downlink transmissions that is applied to a base station, the device comprising:

a processor;

a memory that is configured to store instructions executable by the processor, wherein the processor is configured to:

configure indication information used for identifying the downlink transmissions; and transmit the indication information to a terminal to enable the terminal to identify the downlink transmissions according to the indication information, wherein the indication information comprises a first indication state or a second indication state, wherein the first indication state is used for indicating a fact that no changes occur in a current downlink transmission, which indicates that the current downlink transmission and a previous downlink transmission are within a same Channel Occupancy Time (COT); and the second indication state is used for indicating a fact that the current downlink transmission is a new downlink transmission, which indicates that the current downlink transmission and the previous downlink transmission are within different COTs.

19. A device for identifying downlink transmissions that is applied to a terminal, the device comprising:

a processor;

a memory that is configured to store instructions executable by the processor, wherein the processor is configured to perform the method of claim 9.

\* \* \* \* \*